Nov. 7, 1961 F. A. SUMMERLIN ET AL 3,007,375
CONTOUR-FOLLOWING MACHINE
Filed Aug. 10, 1959 2 Sheets-Sheet 1
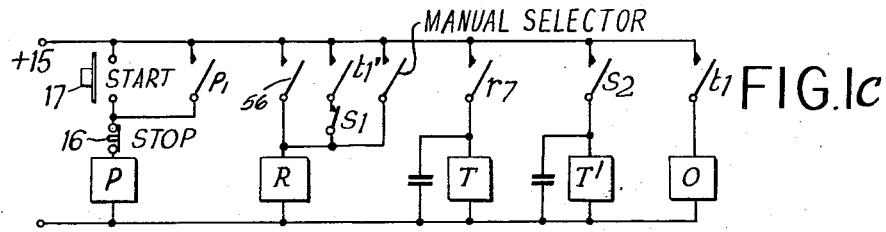
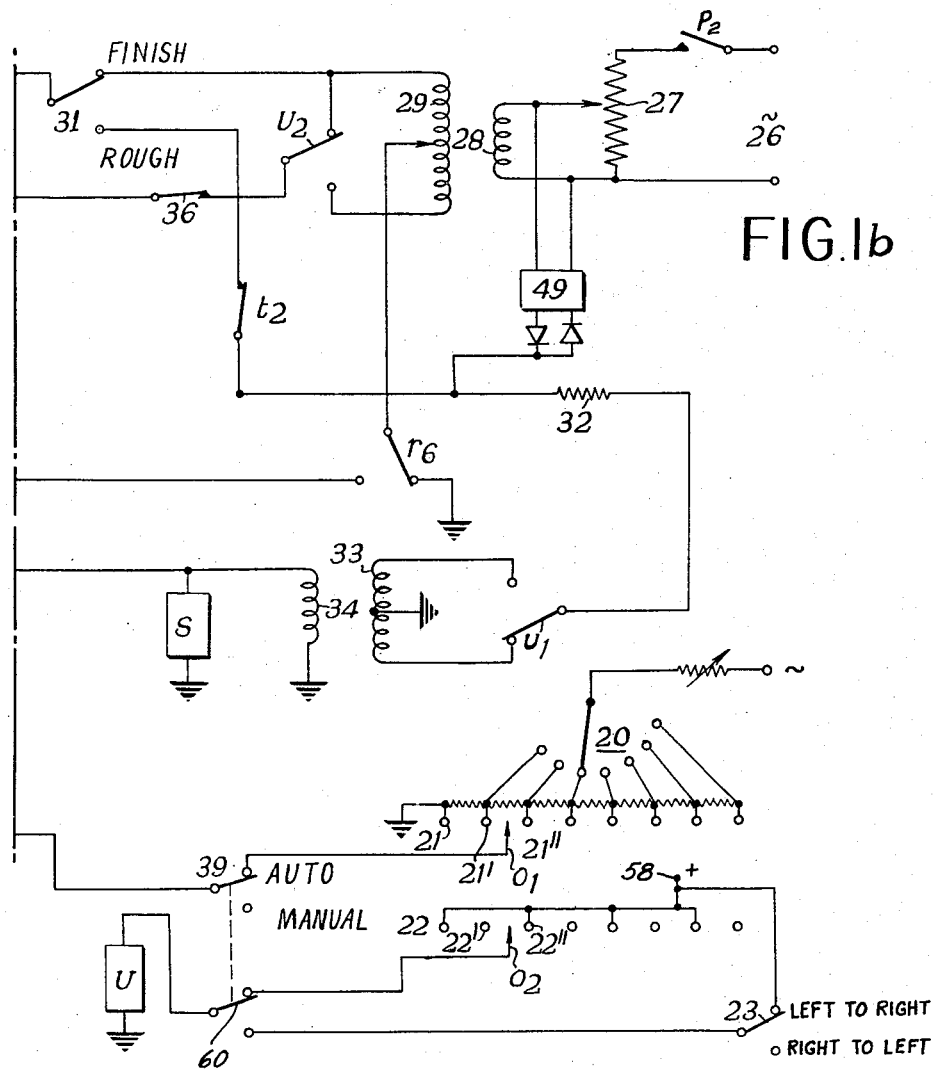
INVENTORS
FREDERICK A. SUMMERLIN
HENRY J. C. WEIGHELL
BY
ATTORNEY

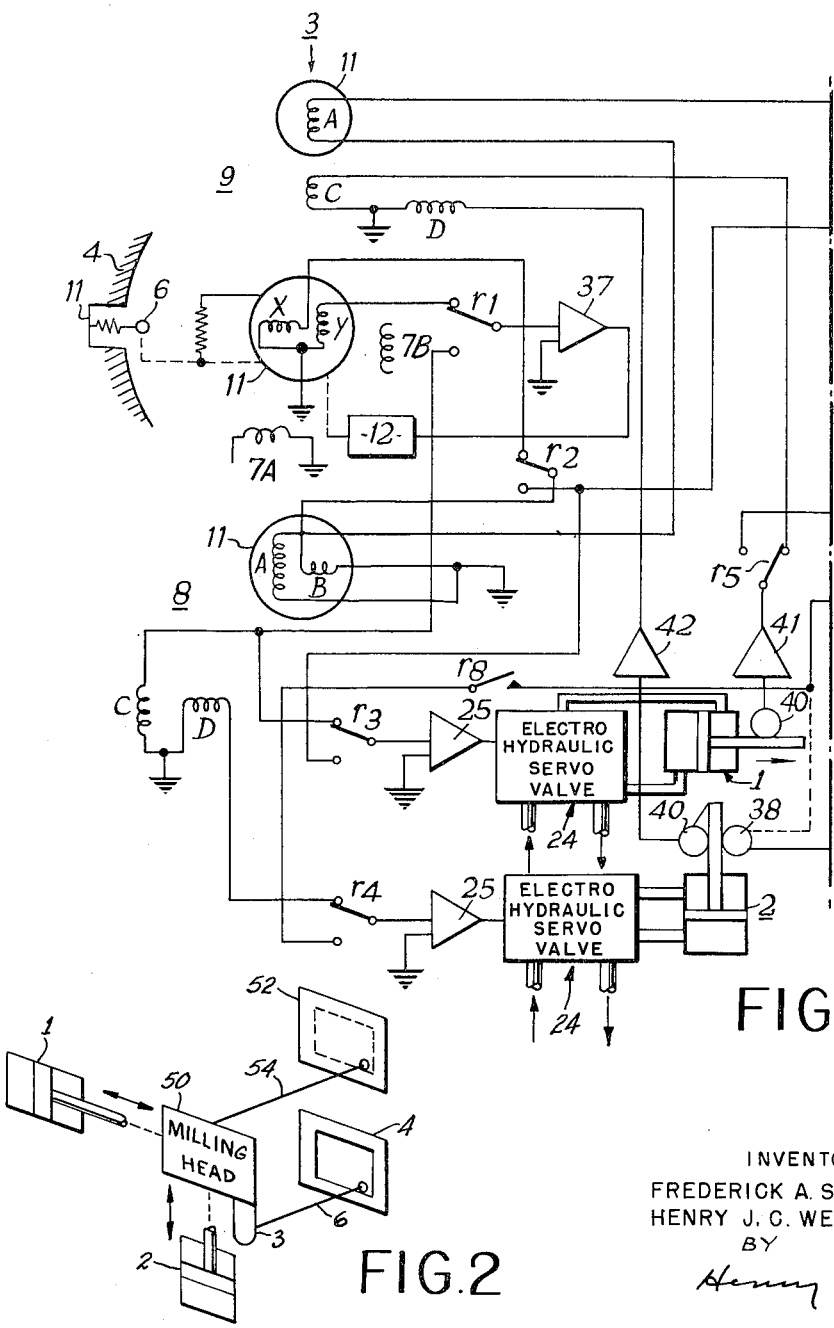

United States Patent Office 3,007,375
Patented Nov. 7, 1961

3,007,375
CONTOUR-FOLLOWING MACHINE
Frederick Arthur Summerlin, Isleworth, and Henry James Cyril Weighell, Kew Gardens, Richmond, England, assignors to The Sperry Gyroscope Company Limited, Brentford, England, a British company
Filed Aug. 10, 1959, Ser. No. 832,602
Claims priority, application Great Britain Aug. 25, 1958
6 Claims. (Cl. 90—62)

This invention relates to contour following machines having a probe unit for following a desired contour defined by a template, for example a machine tool in which a cutting head is arranged to follow the probe unit so that it makes a cut whose shape corresponds with the desired contour.

One object is to provide a neat and simple arrangement for causing the probe unit to follow the desired contour without requiring a substantial force between the probe unit and the template to cause the movement of the cutting head or other equipment which follows the probe unit.

According to the present invention the probe unit has a characteristic direction of sensitivity and includes a pick-off having an output dependent on the angular relationship between the direction of sensitivity and the perpendicular to the contour at the point of contact with the probe unit, and the machine includes means responsive to the output of the pick-off for rotating the probe unit to maintain the direction of sensitivity at a constant angle to the perpendicular to the contour, and means arranged to effect translational movement of the probe unit in a direction at a predetermined angle to the direction of sensitivity such that the movement of the probe unit is tangential to the contour when the direction of sensitivity is at the constant angle to the perpendicular to the contour. Preferably the direction of sensitivity is maintained perpendicular to the contour.

The machine may include two motors for moving the probe unit in the direction of two axes fixed in relation to the template in response to a feed signal, and a resolver set in accordance with the rotational position of the probe unit and arranged to resolve the feed signal into appropriate components to cause operation of the two motors to effect the translational movement of the probe unit. In this way the power for moving the probe unit and following mechanism can be derived from the hydraulic, electric, or other supply for the motors, while the probe unit merely controls the relative movements provided by the two motors along the two axes so that the probe unit follows the desired contour.

In one form of the invention the pick-off associated with the probe unit gives, in dependence on deflection in relation to the probe unit of a probe carried by the probe unit, as caused by contact with the template, an output in a pick-off winding proportional to the deflection of the probe in the direction of sensitivity.

There may then be means arranged to provide in response to the output in the pick-off winding a feed signal connected to be applied through a resolver which resolves the feed signal into appropriate components to cause operation of the two motors to move the probe unit in a direction perpendicular to the contour to tend to maintain the output of the pick-off winding constant. This will keep the probe in contact with the edge of the template with the deflection in relation to the probe unit substantially constant.

The pick-off may give a second output in a second pick-off winding which is proportional to the component of the deflection of the probe in relation to the probe unit which is perpendicular to the direction of sensitivity, and then the means for rotating the probe unit may be energized in accordance with the output of this second pick-off winding to operate to rotate the probe unit to tend to reduce this output to zero. This will maintain the direction of sensitivity perpendicular to the contour as the probe unit moves around the contour, and then the feed movement, which can be perpendicular to the direction of sensitivity, will be tangential to the contour, and the probe unit and following mechanism will trace the desired path.

The machine has particular application to a machine tool having a cutting head arranged to move with the probe unit, and then in order to cut out the material within the desired contour the machine may have a second mode of operation in which the probe unit is traversed in a path between one edge of the template and another, and in which when the probe unit reaches an edge of the template the probe unit is moved around the contour unitil it has moved a certain distance laterally of the traversing path, after which it is re-traversed along a parallel path.

Conveniently there will be a switch associated with the probe and operated by contact between the probe and the edge of the template and arranged to initiate change from the traversing to the lateral movement and back again during the second mode of operation.

When the second mode has been completed and the desired amount of material has been roughly removed, the machine may revert to the contour-following mode of operation to finish the machining.

The invention may be carried into practice in various ways and one embodiment will now be described by way of example as applied to a system for controlling a horizontal end milling machine to mill a flat-bottomed recess of a desired peripheral contour in a workpiece, with reference to the accompanying drawings, of which FIGURES 1A, 1B and 1C, taken together constitute a single diagram of certain of the components and of the electrical connections between them, and FIG. 2 is a diagram illustrating the mechanical relationship of parts of the system. FIG. 1C is the power circuit for a number of relays which operate contacts in FIGS. 1A, 1B and 1C. The mechanical connections between relays and their associated contacts are not shown in order to avoid confusing detail.

As seen in FIG. 2, the milling head 50 can be driven in parallel to the plane of the recess in the workpiece 52 in two directions at right angles, horizontally or "right-and-left" and vertically or "up-and-down," by two hydraulic motors 1 and 2. The milling cutter 54 is shown engaging the workpiece 52. A probe unit 3 is attached to the milling head to be driven in a plane spaced from and parallel to the plane of the recess to be machined in the workpiece. The probe unit has a probe 6 which co-operates with a template 4, whose inner surface corresponds with the shape of the recess to be milled. The probe unit being attached to the milling head, moves with the head, vertically and horizontally, in response to the motors 1 and 2.

The probe unit is used to control the energisation of the motors 1 and 2 so that it follows the profile of the template and the milling head mills a corresponding recess in the workpiece.

The operation is carried out in two stages, a first or rough milling stage, and a finishing stage. In the rough milling stage the probe unit is started, say at the lower left-hand edge of the template, with the milling head in a corresponding position on the workpiece, and the head is controlled to be driven horizontally until the probe contacts the opposite edge of the template, after which the probe unit and milling head are moved a short distance vertically and then driven back horizontally until the probe unit contacts the left-hand edge of the template again. This vertical movement and horizontal traverse is repeated until the whole of the recess has been roughly milled out.

Then in the finishing stage the probe unit is driven tangentially around the template so that the cutter on the milling head effects a finishing cut.

THE PROBE UNIT

The probe unit 3 includes a rotatable carriage 11 that carries the probe 6 which is spring-loaded in one direction—"the direction of sensitivity"—and two pick-off windings X and Y are provided which give respective outputs in dependence on the deflection of the probe in relation to its supporting carriage 11 in the direction of sensitivity, and in a direction perpendicular to this. The windings X and Y are indirectly coupled with windings 7A and 7B, fixed angularly in relation to the template and connected betwen earth and a tapping on a potentiometer connected across an A.C. source. The spring load ensures that there is always an output from the X winding unless the probe is in contact with the template so that the probe is deflected enough in the direction of sensitivity to have zero output in winding X. The unit also carries two synchro resolvers 8 and 9 whose rotors are secured to the carriage 11 which carries the probe 6 and the pick-off windings X and Y, so that the axis of each of the rotor windings of the resolvers is always parallel with the axis of one of the X and Y windings of the pick-off. Each resolver has one rotor winding A which is parallel with the axis of the pick-off winding Y, while the resolver 8 also has a rotor winding B parallel with the axis of the X winding, which in turn is parallel to the direction of sensitivity of the probe. The stator windings C and D of the resolvers 8 and 9 are fixed angularly in relation to the template, and thus have outputs which are components of the excitation of the rotor windings, in dependence on the angular position of the rotor-and-pick-off carriage 11 in relation to the template.

A motor 12 is arranged to rotate the carriage 11 in relation to the template.

THE CIRCUIT

Referring now to FIGS. 1A, 1B and 1C, the circuit includes seven relays P, O, R, S, T, T′ and U which have respectively two normally-open contacts $p_1$ and $p_2$; a pair of stepping contacts $o_1$ and $o_2$; six change-over contacts $r_1$–$r_6$; and two normally-open contacts $r_7$ and $r_8$; one normally-closed contact $s_1$, and one normally-open contact $s_2$; one normally-open contact $t_1$ and one normally-closed contact $t_2$; one normally-open contact $t_1'$; and two change-over contacts $u_1$ and $u_2$.

The relay P is connected across a D.C. source 15 for the relays in series with a normally-closed switch controlled by a "stop" button 16 and a normally-open "start" button 17, which latter is shunted by the normally-open contact $p_1$.

The relay O is connected in series with the normally-open contact $t_1$ across the source 15. Its contacts $o_1$ and $o_2$ move along one step each time it is de-energised, so that its contact $o_1$ successively makes with a number of studs 21, 21′ etc. and its contact $o_2$ makes with studs 22, 22′ etc. which are alternately connected to a D.C. source 58 and are open-circuited.

The relay R is connected across the source 15 through three parallel arms, the first of which contains a contact 56 which co-operates with the probe 6 to be closed unless the probe is in contact with the edge of the template 4; the second of which includes the normally-closed contact $s_1$ and the normally-open contact $t_1'$ in series, and the third of which includes a normally-open switch which can be closed if the system is to be operated manually.

The relay S is connected to be energised in accordance with the value of a vertical movement demand signal as will be described more fully below.

The relay T and the relay T′ are connected across the source 15 in series respectively with the normally-open contacts $r_7$ and $s_2$. Both of these latter relays are time delay relays which operate to return their contacts to the normal position after a short time interval following the removal of their excitation.

The relay U can be connected in series with a "left-right" manual selector switch 23 to the D.C. source 58, or to the stepping contact $o_2$ in dependence on the setting of a manual automatic two-way switch 60.

The drawing shows the circuit arranged in the "finishing" mode with the relay P only energised.

The motors 1 and 2 are controlled by electro-hydraulic servo-valves 24 energised by electric signals from amplifiers 25, and these amplifiers are energised for producing cutting feed from a source 26 which is connected through the normally-open contact $p_2$ to a potential divider 27 whose output is connected across the primary winding 28 of a transformer having a secondary winding 29 whose centre tap is connected through the change-over contact $r_6$ to earth or to the fixed contact of the change-over contact $r_5$ according as the relay R is de-energised or energised. When it is energised the contact $r_5$ completes the circuit through a buffer amplifier and a tachometer to be described below. The valves 24 are connected by inlet and exhaust conduits to a suitable hydraulic pressure supply system not shown.

The ends of the secondary winding 29 are connected respectively to the two fixed contacts of the change-over contact $u_2$ whose position determines the polarity of the voltage from the secondary winding 29 which is used for the feed arrangements in the rough milling stage and hence the direction of horizontal feed. One end of the secondary winding 29 is also connected to a fixed contact of a selector switch 31 whose moving contact is connected to this first fixed contact during the finishing stage, and is connected to a second fixed contact during the rough milling stage. This ensures that during the finishing stage the feed is always in the same direction. The second fixed contact is connected through the normally-closed contact $t_2$ and a resistor 32 to the change-over contact $u_1$ whose two fixed contacts are connected to opposite ends of the earthed-centre-tap secondary winding 33 of a transformer whose primary winding 34 is connected across the relay S.

The moving contact of the selector switch 31 is connected to earth through the rotor windings A of the two resolvers 8 and 9 in series.

The moving contact $u_2$ is connected through a button 36, which can be pressed during the rough milling stage to enable the horizontal traversing to be stepped-to the normally-open fixed contacts $r_2$ and $r_3$. The normally-closed fixed contact $r_2$ is connected to earth through the pick-off winding X which is parallel with the direction of sensitivity of the probe 6, and the normally-closed fixed contact $r_3$ is connected to earth through the stator winding C of the resolver 8 and also to the normally-open fixed contact $r_1$. The normally-closed fixed contact $r_1$ is connected to earth through the pick-off winding Y.

The change-over contacts $r_2$, $r_3$ and $r_1$ are respectively connected to earth through the rotor winding B of the resolver 8, the input of an amplifier 25 for the left-right motor 1, and the input of an amplifier 37 whose output is connected to energise the motor 12 for rotating the carriage 11.

The change-over contact $r_4$ is connected to the input of the amplifier 25 for the up-and-down motor 2 and its normally-closed fixed contact is connected to earth through the stator winding D of the resolver 8, while its normally-open fixed contact is connected in series with the normally-open contact $r_8$ to one end of the relay S and the primary winding 34 connected across it. The junction of the contact $r_8$ with the relay S is connected to the contact $o_1$ through a pick-off 38 whose output is proportional to the vertical movement of the milling head, and through an automatic-manual switch 39.

Each of the motors 1 and 2 drives a tachometer 40 which feeds a rate-of-horizontal or vertical traverse signal through a buffer amplifier 41 or 42 to the stator winding C or D of the resolver 9. The connection from the tachometer driven by the left-to-right or horizontal motor 1 goes through the normally-closed fixed contact $r_5$.

*Operation*

ROUGH MILLING STAGE

The machine is set up with the probe 6 at the bottom left-hand corner of the template 4 and the switch 31 in the position for rough milling. Stepping contacts $o_1$ and $o_2$ of relay O are respectively at studs 21 and 22. Relay U is energized. The "start" button 17 is pressed to energise the relay P which closes its holding contacts $p_1$ to maintain its energisation when the "start" button is released, and to close the contact $p_2$ to supply the traversing control voltage to the system. The probe 6 will be just clear of the template 4 so that its contacts 56 are closed and the relay R will be energised. The contacts $r_1$–$r_6$ will be changed-over from the positions shown in the drawing and the output from the pick-off winding X will be disconnected. Windings A are opened by $t_2$ as a result of $r_7$ closing.

A rate-of-traverse control voltage will be supplied from the secondary winding 29 through the contact $u_2$, the stop button 36, and the normally-open fixed contact $r_2$ to the rotor winding B of the resolver 8, and also through the normally-open fixed contact $r_3$ to the input of the amplifier 25 controlling the right-to-left motor 1. The tachometer 40 driven from this motor will have its output fed through the amplifier 41 and the normally-open contacts $r_5$ and $r_6$ to the center tap of the secondary 29.

It will be seen that with the relay R energised, and the contacts $r_4$ and $r_1$ in their switched positions, the stator winding D of the resolver 8 will be disconnected, while the stator winding C of the resolver 8 will be connected to the input of the amplifier 37 which controls the energisation of the motor 12. Thus if the axis of the rotor winding B of the resolver 8 has any component parallel with the axis of the stator winding C, the motor 12 will be driven to rotate the support 11 until no such component exists. In this condition the angular relationships between the rotors and stators of the resolvers will be as shown in FIG. 1A, and the axis of the pick-off winding X, which is parallel to the sensitivity direction of the probe 6, will be parallel to the horizontal or right-to-left direction of movement of the motor 1.

As already described, the rate-of-traverse voltage will be supplied to this motor 1 from transformer secondary 29 through amplifier 25, so that the probe and the milling head will be traversed horizontally in the appropriate direction as determined by the position of the change-over contact $u_2$. During this movement a vertical traverse signal is fed through the contacts $r_8$ and $r_4$ to the amplifier 25 for the up and down motor 2, but this is backed off by the output from the vertical pick-off 38, so that there will be no vertical movement during the horizontal traverse.

When the probe makes contact with the edge of the template 4 at the end of the traverse, the probe contacts 56 in series with the relay R will open, and the relay will be de-energised to change over its contacts $r_1$, $r_2$, $r_3$, $r_4$, $r_5$, $r_6$ and to open the contacts $r_7$ and $r_8$, so that they will now be as shown in the drawing. In this condition the contacts $r_2$ and $r_3$ are switched so that no rate-of-feed voltage is applied to the amplifiers controlling the motors 1 and 2 from the secondary winding 29.

However, when the probe 6 makes contact with the template 4 it will be deflected in relation to its carriage 11 in a direction perpendicular to the part of the template with which it has made contact, and this movement will induce component voltages in the pick-off windings X and Y. The component induced in the winding Y will be fed through the contact $r_1$ to the amplifier 37 controlling the motor 12 so that the carriage 11 will be rotated until the winding Y is tangential to the template 4, and so that the sensitivity direction and the direction of the windings X are normal to the edge of the template.

The output of the winding X is fed through the contact $r_2$ to the rotor winding B of the resolver 8, and this will induce resolved voltages in the stator windings C and D whose relative magnitude depends upon the angular position of the carriage 11 and the rotor winding B in relation to the workpiece, and these voltages will be supplied through the contacts $r_3$ and $r_4$ respectively to the amplifiers controlling the motors 1 and 2, which will operate to control the probe to be maintained just in contact with the template 4, with the probe 6 deflected enough in the direction of sensitivity to have zero output from the winding X. The probe contacts 56 will be open.

A short time interval after the operation of the relay R and the opening of the contact $r_7$, the relay T is de-energised so that the contact $t_1$ opens and de-energises the relay O, which thus moves its contacts $o_1$ and $o_2$ through one step to make contact respectively with the next studs, say, 21' and 22'. When the contact $o_2$ makes with the contact 22' the relay U is disconnected from the source 21 and the contacts $u_1$ and $u_2$ change over to prepare for a change in the polarity of the traverse-controlling voltage in readiness for the next traverse of the probe back towards the first edge of the template 4.

When the contact $o_1$ makes with the stud 21' a vertical movement voltage from the potentiometer 20 is connected in series with the pick-off 38 across the primary winding 34, so that a corresponding voltage is connected through the resistor 32, the contact $t_2$ (which is now closed), and the switch 31 to the stator winding A of the resolvers 9 and 8. This voltage is limited to correspond to a set rate-of-movement round the contour by a rectifier 49 between the primary winding 28 and the junction between the resistor 32 and the contact $t_2$.

The voltage in the rotor winding A of the resolver 8 induces component voltages in the stator windings C and D, which energise the amplifiers controlling the motors 1 and 2 in accordance with the angular relationship between the carriage 11 and the workpiece, so that the probe unit and milling head are moved tangentially until when the pick-off signal 38 balances the vertical traverse demand signal derived from the relay O, the net vertical traverse signal disappears.

During the vertical movement, the outputs of the tachometers 40 are fed to the windings C and D of the resolver 9 and the components induced in the winding A balance the ordered rate-of-traverse.

When the vertical traverse signal disappears due to the change in the output of the pick-off 38, the relay S drops out and its contact $s_1$ closes, and its contact $s_2$ opens. Before $s_2$ opens, and for a short time afterwards, the contact $t_1'$ is closed and thus the relay R will again be energised so that the contacts $r_1$, $r_2$, $r_3$, $r_4$, $r_5$, $r_6$ will change over and a horizontal rate-of-traverse voltage of opposite polarity (because $u_2$ has changed over) will be supplied to the system. After the time delay of the relay T'—which is long enough to ensure that the probe will have moved far enough from the template 4 for its contacts to close again—the contact $t_1'$ opens and the operation resumes as before.

This operation is repeated until a recess corresponding to the whole of the template has been roughly machined from the workpiece, and then the selector switch 31 is switched to the finish stage.

FINISH STAGE

In this mode of operation the contacts are as shown in the drawing and the motor 12 operates to maintain the sensitivity direction of the probe 6 and the axis of the pick-off winding X always normal to the profile of the template 4, since any tantential component of deflection of the probe by the template will produce a voltage from the pick-off winding Y which will energise the motor 12 to restore the probe's direction of sensitivity to the normal. The output of the pick-off winding X in response to probe deflection components parallel to the direction of sensitivity, is supplied to winding B of resolver 8 where it is resolved into the appropriate components in the stator windings C and D to provide, if necessary, through motors 1 and 2, drive components to the probe unit 3 in a direction perpendicular to the template contour, in order to maintain the probe in contact with the edge of the template with a substantially constant deflection relative to the probe unit in a direction perpendicular to the contour.

The rate-of-feed signal is now supplied from the secondary winding 29, through the selector switch 31, to the rotor windings A of the resolvers 9 and 8. The excitation of the winding A of the resolver 8 will induce voltages in the stator windings C and D which components are used to control the motors 1 and 2 in accordance with the angular relationship between the carriage 11 and the workpiece so that the probe unit and the milling head continue to move at right-angles to the direction of sensitivity of the probe, and thus tangentially with the profile of the template 4. Feedback is provided from the tachometers 40 through the buffer amplifiers 41 and 42 to the stator windings C and D of the resolver 9, and these include in the rotor winding A a voltage which opposes the initial feed signal to ensure that a precise feed rate is obtained.

In this way the head and the cutter are moved completely around the profile of the template to finish the milling of the wall of the recess.

We claim:

1. Apparatus for following the contour of a template that is angularly fixed relative to a pair of intersecting axes comprising a support member, a probe for contacting said template to be deflected thereby, said probe being supported by said support member and deflectable with respect thereto, said probe having a characteristic direction of sensitivity, means responsive to probe movement involving departure of said direction of sensitivity from a predetermined angle with the tangent to the template surface at the point of contact by the probe for restoring said predetermined angular relationship between the direction of sensitivity and said tangent, a resolver having a pair of relatively movable members and signal input and outputs for resolving a signal applied to the input into components at respective outputs of the resolver in accordance with the relative position of said movable resolver members, one of said movable resolver members having a predetermined constant relation with said direction of sensitivity, the other movable resolver member having a predetermined constant relation with said first pair of axes, a first motor for providing relative movement between said support member and said template along a line parallel to one of said pair of axes in response to one of said resolver outputs, a second motor for providing relative movement between said support member and said template along a line parallel to the other of said pair of axes in response to another output of said resolver, and means responsive to movement of the probe in said direction of sensitvity for supplying a signal to said resolver signal input.

2. Apparatus for following the contour of a template comprising a support member which is movable along lines parallel to each of a pair of relatively fixed intersecting axes to produce a resultant translation of the support, a probe for contacting said template to be deflected thereby, said probe being supported by said support member and deflectable with respect thereto, said probe having a characteristic direction of sensitivity, means responsive to probe movement involving departure of said direction of sensitivity from a predetermined angle with the tangent to the template surface at the point of contact by the probe for restoring said predetermined angular relationship between the direction of sensitivity and said tangent, a resolver having a pair of relatively movable members and signal input and outputs for resolving a signal applied to the input into components at respective outputs of the resolver in accordance with the relative position of said movable resolver members, one of said movable resolver members having a predetermined constant relation with said direction of sensitivity, the other movable resolver member having a predetermined constant relation with said pair of axes, a first motor for moving said support member along a line parallel to one of said axes in response to one of said resolver outputs a second motor for moving said support member along a line parallel to the other of said axes in response to another output of said resolver, and means responsive to movement of the probe in said direction of sensitivity for supplying a signal to said resolver signal input.

3. Apparatus for following the contour of a template comprising a support member which is movable along lines parallel to each of a pair of relatively fixed intersecting axes to produce a resultant translation of the support, a probe for contacting said template to be deflected thereby, said probe being supported by said support member and deflectable with respect thereto, said probe having a characteristic direction of sensitivity, means responsive to probe movement involving departure of said direction of sensitivity from a predetermined angle with the tangent to the template surface at the point of contact by the probe for restoring said predetermined angular relationship between the direction of sensitivity and said tangent, a resolver having a pair of relatively movable members and signal inputs and outputs for resolving signals applied to the inputs into components at respective outputs of the resolver in accordance with the relative position of said movable resolver members, one of said movable resolver members having a predetermined constant relation with said direction of sensitivity, the other movable resolver member having a predetermined constant relation with said first pair of axes, a first motor for moving said support member along a line parallel to one of said pair of axes in response to one of said resolver outputs, a second motor for moving said support member along a line parallel to the other of said axes in response to another output of said resolver, means responsive to movement of the probe in said direction of sensitivity for supplying a signal to one signal input of said resolver, a second resolver having a pair of relatively movable members and first, second and third windings, for inducing a signal component in the first winding by signal components supplied to said second and third windings in accordance with the relative position of the resolver members, one of the members of the second resolver having a constant predetermined relation with said direction of sensitivity, the other member of the second resolver having a constant predetermined relation with said pair of axes, a signal supply source connected through said first winding of the second resolver to another signal input of the first resolver, and means responsive to the respective feed-rates of said first and second motors for supplying signals respectively to said second and third windings of the second resolver.

4. Apparatus for following the contour of a template comprising a base which is movable along lines parallel to each of a pair of relatively fixed intersecting axes to produce a resultant translation of the base, said base being angularly fixed relative to said axes, a carriage rotatably mounted on said base, a probe for contacting said template to be deflected thereby, said probe being supported by said carriage and deflectable with respect thereto, said probe having a characteristic path of sensitivity, first pick-off means responsive to deflection of the probe for producing an output which is a function of the deflection component of the probe in said path of sensitivity, second pick-off means responsive to deflection of the probe for producing an output which is a function of the deflection component of the probe in a second path in which intersects said path of sensitivity at a fixed angle, a motor responsive to the output of the second pick-off means for rotating said carriage in response to deflection components of the probe in said second path for maintaining said path of sensitivity at a constant angle to the perpendicular to the tangent of the template contour at the point of engagement of the template by the probe, a resolver having a pair of relatively movable members and two signal inputs and two outputs for resolving signals applied to the inputs into components at the respective outputs of the resolver in accordance with the relative position of said movable resolver members, one of said movable resolver members having a predetermined constant relation with said path of sensitivity, the other movable resolver member having a predetermined constant relation with said pair of axes, means for coupling the output of the first pick-off means to one input of the resolver, means for supplying an input feed signal to the other input of the resolver, a first motor for moving said base along a line parallel to one of said pair of axes in response to one of said resolver outputs, and a second motor for moving said base along a line parallel to the other of said axes in response to the other of said resolver outputs.

5. Apparatus for following the contour of a template comprising a base which is movable along lines parallel to each of a pair of relatively fixed intersecting axes to produce a resultant translation of the base, said base being angularly fixed relative to said axes, a carriage rotatably mounted on said base, a probe for contacting said template to be deflected thereby, said probe being supported by said carriage and deflectable with respect thereto, said probe having a particular path of sensitivity, pick-off means responsive to deflection of the probe, said pick-off means including a first pick-off winding for producing an output which is a function of the deflection component of the probe parallel to the path of sensitivity, said pick-off means further including a second pick-off winding for producing an output which is a function of the deflection component of the probe parallel to a second path perpendicular to said path of sensitivity, a motor responsive to the output of said second pick-off winding for rotating said carriage in response to deflection components of the probe along said second path for maintaining said second path parallel to the tangent of the template contour at the point of engagement of the template by the probe, a resolver having first and second rotor windings each having a constant predetermined relation to said carriage, said resolver having stator windings each having a constant predetermined relation to said pair of axes, means for coupling the first pick-off winding to one of said resolver rotor windings, means for supplying an input feed signal to the other of said resolver rotor windings, a first motor for moving said base along a line parallel to one of said pair of axes in response to the output of one of said resolver stator windings, and a second motor for moving said base along a line parallel to the other of said pair of axes in response to the output of the other of said resolver stator windings.

6. In an apparatus for following a contour, which includes a contour contacting probe that is translatable along lines parallel to respective ones of a pair of intersecting axes by respective first and second feed motors, the combination therewith of means for energizing in one sense one of said feed motors, means responsive to a predetermined limit of traverse of said probe along a line parallel to the axis fed by said one motor for reversing the sense of said energization to said one motor, and means responsive to each of successive traverses of the probe in opposite directions parallel to the last said axis for energizing the other feed motor to provide incremental traverse of the probe in a direction parallel to the axis fed by said other motor between successive traverses of the probe in opposite directions parallel to the axis fed by said one motor.

References Cited in the file of this patent

UNITED STATES PATENTS

| | | |
|---|---|---|
| 2,627,055 | Calosi | Jan. 27, 1953 |
| 2,814,239 | Lavieri et al. | Nov. 26, 1957 |
| 2,939,368 | Eisengrein | June 7, 1960 |

FOREIGN PATENTS

| | | |
|---|---|---|
| 459,685 | Great Britain | Jan. 13, 1937 |